United States Patent [19]

Juner et al.

[11] 4,297,580

[45] Oct. 27, 1981

[54] X-RAY OPTICAL SYSTEM FOR ARTICLE INSPECTION, WITH COMPONENTS DISPOSED ON PARALLEL AXES

[75] Inventors: Adolph Juner, City Island; David J. Haas, Suffern, both of N.Y.

[73] Assignee: North American Philips Corporation, New York, N.Y.

[21] Appl. No.: 75,467

[22] Filed: Sep. 14, 1979

Related U.S. Application Data

[63] Continuation of Ser. No. 864,503, Dec. 27, 1977, abandoned.

[51] Int. Cl.$^3$ .............................................. G01T 1/00
[52] U.S. Cl. .................................. 250/368; 250/492.1
[58] Field of Search ............... 250/368, 367, 363, 362, 250/361, 490, 491, 492 R, 505; 350/288, 299, 301, 304

[56] References Cited

U.S. PATENT DOCUMENTS

| | | | |
|---|---|---|---|
| 3,018,375 | 1/1962 | Graves et al. | 250/368 |
| 3,291,985 | 12/1966 | Graves et al. | 250/368 |
| 3,381,136 | 4/1968 | Carbone et al. | 250/368 |
| 3,980,889 | 9/1976 | Haas et al. | 250/492 R |

Primary Examiner—Bruce C. Anderson
Attorney, Agent, or Firm—Thomas A. Briody; Robert T. Mayer; Paul R. Miller

[57] ABSTRACT

An X-ray optical system for examining articles, comprising a source of X-rays directed in a generally downward first direction, fluorescent screen means for converting the X-rays to a light image, such screen means being disposed below said X-ray source, means for receiving the article between the X-ray source and the fluorescent screen means such that X-rays passing through the article reach the screen means to generate thereat a light image of the article, a first light reflecting means disposed generally below the fluorescent screen means so as to receive the light image from the fluorescent screen means, such light image being directed generally in the first direction, second light reflecting means disposed opposite and obliquely to the first light reflecting means, so as to receive the light image reflected from the first light reflecting means and to redirect the light image in a generally upward second direction, and means for viewing the light image, such viewing means being disposed above the second light reflecting means.

20 Claims, 1 Drawing Figure

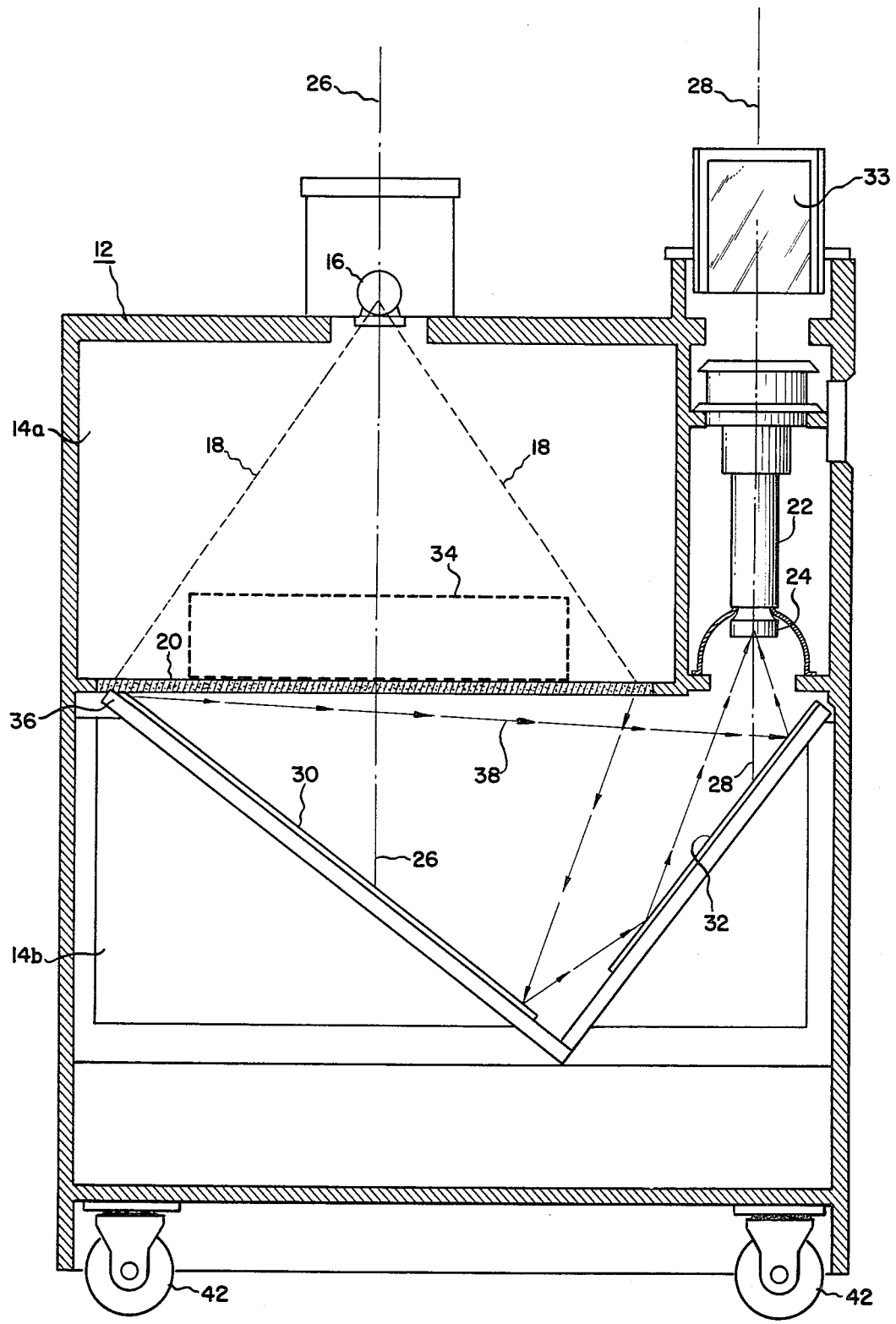

X-RAY OPTICAL SYSTEM FOR ARTICLE INSPECTION, WITH COMPONENTS DISPOSED ON PARALLEL AXES

This is a continuation of application Ser. No. 864,503, filed Dec. 27, 1977 now abandoned.

BACKGROUND OF THE INVENTION

The present invention relates to X-ray apparatus, particularly to such apparatus usable for inspecting various articles. The recent high incidence of terrorist bombings, aircraft hijackings, and other unlawful acts including property thefts has prompted and necessitated the development of inspect-systems for locating bombs, weapons, and other dangerous objects in luggage, purses, mail, etc.

Some such inspection systems utilize X-rays that are passed through the articles that are to be inspected to form a latent image, which is then converted to a visible image for inspection. In general, this type of inspection system includes an X-ray source for directing an X-ray beam in a certain direction and a fluorescent screen in the path of the X-ray beam, with the article that is to be inspected locatable in the beams path between the source and the X-ray screen. The X-ray image is converted to a light image by the fluorescent screen, the visible image then being viewable with a camera system or by other means known in the art. In this type of system, the X-ray source, fluorescent screen, and camera system (or other optical system) generally are located on the same axis so that the X-ray beam path is along this axis and extends directly from the X-ray source to the optical system. In general, this arrangement is undesirable because of the elongated structure that results, making it difficult to view the image of the inspected article and further, necessitating that the inspected article be raised to a considerable height for placement in the inspection system. A variety of such X-ray inspection system are so modified that a single reflecting surface is located between the fluorescent screen and the optical system, and the light image from the florescent screen is re-directed toward the optical system. Consequently, the X-ray source and the fluorescent screen are located on one axis and the optical system is located on another axis, with both axes intersecting at the reflecting surface. However, this modified system is not fully desirable because it, too, is considerably bulky.

The present invention seeks to overcome or at least alleviate the shortcomings and problems of the prior art inspection systems and to provide further advantages which include providing a structure that can have the viewing position and the chamber loading port located so as to be optionally situated according to human factors engineering standards.

BRIEF SUMMARY OF THE INVENTION

An X-ray optical system for examining an article, comprising a source of X-rays directed in a generally downward first direction and fluorescent screen means for converting the X-rays to a light image. The screen means is disposed below the X-ray source and the system further includes means for receiving the article between the X-ray source and the fluorescent screen means such that X-rays passing through said article reach the screen means to generate thereat a light image of the article. The system further comprises a first light-reflecting means disposed generally below the fluorescent screen means so as to receive the light image from the fluorescent screen means, the light image moving generally in the first direction. A second light-reflecting means is disposed opposite and obliquely to the first light-reflecting means, so as to receive the light image reflected from the first light-reflecting means and to redirect the light image in a generally upward second direction and means for viewing the light image are disposed above the second light-reflecting means.

BRIEF DESCRIPTION OF DRAWING

The FIGURE is a schematic representation, in front elevation view, of the X-ray inspection apparatus of the present invention.

PREFERRED EMBODIMENT

Referring to the FIGURE, the X-ray inspection apparatus 10 preferably comprises an X-ray impermeable housing or cabinet 12 that contains an interior chamber 14. Further included in the apparatus 10 is a source 16 of an X-ray beam 18 directed in a predetermined direction, preferably downward, and a fluorescent screen 20, such source 16 and the screen generally being known to the art. The X-ray source 16 can be a standard industrial X-ray tube, e.g., an X-ray tube sold by Amperex under the trademark RI-80, which can be operated in the range of 60 to 100 KV., and the fluorescent screen 20 can be a standard industrial fluorescent screen, such as that sold under the Dupont trademark E-2.

The apparatus 10 further includes an optical system 22 that comprises an objective lens 24 and can include an image intensifier of a type known to the art. The X-ray source 16 and fluorescent screen 20 are located on a first axis 26, while the optical system 22 is located on a second axis 28, the first and second axes 26 and 28, respectively, being substantially parallel to each other and substantially vertical, it being preferred that the axes be parallel and vertical.

The apparatus 10 also comprises first and second radiation-reflecting members 30 and 32, respectively, e.g., objective mirrors, these reflecting members 30 and 32 being disposed obliquely to each other and the first reflecting member 30 being disposed at the first axis 26 so as to receive a radiation image from the fluorescent screen 20 and reflect it toward the second reflecting member 32, which is disposed at the second axis 28. It is generally preferred that the reflecting members 30, 32 be front surface mirrors, which can reflect the radiation image directly from the reflecting layer of the mirrors without the image passing through the transparent layer of the mirrors to reach the reflecting layer and then passing through the transparent layer once again after the reflection thereof.

The second reflecting member 32 is located so as to receive the radiation image from the first member 30 and direct same toward the optical system. It is generally preferred that the first and second reflecting members 30, 32 be disposed at substantially right angles to each other, they being located in the mirror chamber 14b together with the fluorescent screen 20 and the optical system 22. The fluorescent screen 20 can be carried by the housing 12, it being preferred that the screen comprise a layer of X-ray permeable material facing the X-ray source 16 and that a layer of fluorescing material be located at the screen side more remote from the X-ray source 16. It is particularly preferred that the screen 20 be sufficiently strong and securely mounted so as to be able to support the various articles that are to be inspected, the screen 20 being able to constitute the bottom of the article chamber 14a.

It can be seen that the above arrangement has a generally U-shaped profile, with a result being a more squat structure, thus facilitating the observation of the visible image of the inspected article. This compares quite favorably with the above-described prior art devices, whose various component parts are located on a single axis or on two axes that generally are perpendicular to each other.

It is especially preferred that the first reflecting member 30 be disposed near to the fluorescent screen 20, the position of the second reflecting member 32 with respect to the first member 30 being in accordance with the foregoing description, but, nevertheless, it being preferred that the optical system 22 be disposed near to and above the second reflecting member 32. The X-ray impermeable housing 12 can be a lead-lined cabinet or some other suitable structure.

Particularly preferred is a source 16 that provides a wide-angle X-ray beam 18, e.g., one having an angle of about 60° or greater. It is generally preferred that the optical system comprise a light reflector or mirror 33 that is disposed so as to receive and reflect to the viewer the light image of the article to be inspected. The mirror 33 can be pivotably mounted, e.g., on a gimble, to permit it to be adjusted. Where it is desired, a television camera or other device can be incorporated in the apparatus 10, to permit remote position viewing. Where the image is to be viewed directly, the mirror 33 can be (and preferably is) located at a level that is comfortable to the average individual, this being greatly facilitated by the present invention.

In the operation of the apparatus, the generated X-ray beam 18 travels from the source 16 to the fluorescent screen, it passing through an article 34 (shown in phantom view) that is to be inspected. The real time visible X-ray image of the article 34 is converted to a visible image by the fluorescent screen, the visible image passing through the screen 20 and reaching the first reflecting member 30, by which it is directed toward the second reflecting member 32. The reflected visible image is then again reflected by the second reflecting member 32 and directed by the latter toward the optical system 22 and is viewed on the mirror 33.

It is preferred that the first reflecting member 30 be obliquely disposed with respect to the fluorescent screen 20 (e.g., that they form an acute angle, of, for example, 45°) and that the upper end 36 of the first reflecting member be near or next to the fluorescent screen 20. A desired result is that the rays of light 38 reflected by the first reflecting member 30 and located nearest the fluorescent screen, travels toward the second reflecting member 32 along a path that is substantially parallel to the adjacent the fluorescent screen.

The reflecting members 30, 32 should be sufficiently large to intercept fully the largest image that is expected to be produced with this apparatus 10.

According to a preferred embodiment of the invention, the optical system has a distant focus, i.e., a focal point of about three feet or more from the operators' normal eye position, which is about the location of the viewing mirror 33. This permits a significant reduction in the viewers eye fatigue and permits observation of the image at a relatively close distance.

The apparatus 10 further comprises an X-ray impermeable door (which can be mechanically and/or manually operated) located at one of the walls (e.g., the front wall) of the cabinet, it being possible, however, to have a door at the front and another door at the back of the cabinet 12, allowing the article 34 to be placed via one door into the chamber 14 and removed via the second door. The height of the bottom of the chamber 14 is preferred to be such as to be convenient for the apparatus operator to lift the articles for placement into the chamber 14, a standard average height being about 29 inches according to human factors engineering.

Further, the apparatus 10 can be mounted on wheels or casters 42, so as to permit it to be moved about. Also, the apparatus 10 comprises electronic circuitry of the sort known to the art, for controlling the X-ray source 16 and, where desired, the image viewing system 22.

Due to the particular U-shaped arrangement of the invention, there is derived the further advantage that the possibility of X-ray leakage is significantly lowered. This is due to the fact that the X-rays must, in order to escape from the viewing area of the apparatus 10, turn about 180°, which comprises with a 90° turn in those prior art devices where the axes of the X-ray beam an viewing system are perpendicular, and with a zero degree turn for the single axis device of the prior art. This results from the fact that each time the X-ray beam may be reflected from a reflecting surface (the present system requiring two reflections from the reflectors 30, 32 and the perpendicular axes prior art device having only a single reflection of the beam, with no reflection in the straight axis prior art device), there is a reduction of the intensity of the X-ray beam by a factor of about one thousand.

It is preferred that the door or port and the controls (not shown) of the apparatus 10 be located near the viewing station or mirror 33 thereof to permit the operation of the apparatus and the loading and unloading of the various articles without the operators' needing to move from a certain position, reducing fatigue and increasing efficiency.

We claim:

1. An X-ray optical system for examining an inanimate article, comprising:
   (a) a source of X-rays directed in a generally downward first direction,
   (b) a flourescent screen means for converting said X-rays to a light image, said screen means being disposed below said X-ray source,
   (c) means for receiving said article between said X-ray source and said fluorescent screen means such that said X-rays passing through said article reach said screen means to generate thereat a light image of said article,
   (d) a first light reflecting means disposed below said flourescent screen means for receiving said light image from said fluorescent screen means, said light image being directed in said first direction,
   (e) second light reflecting means disposed opposite and obliquely to said first light reflecting means for receiving said light image reflected from said first light reflecting means and for redirecting said light image in a upward second direction, and
   (f) means for viewing said redirected light image, said viewing means being disposed above said second light reflecting means, said viewing means including an image intensifier for receiving said light image from said second light reflecting means.

2. An X-ray optical system for examining an article, as in claim 1, wherein said first and second directions are at least substantially parallel.

3. An X-ray optical system for examining an article, as in claim 1, wherein said article receiving means comprises an X-ray impermeable chamber partially defined by a closable opening by which said article is introduced into said chamber.

4. An X-ray optical system for examining an article, as in claim 1, wherein said first and second light reflecting means comprise mirrors.

5. An X-ray optical system for examining an article, as in claim 1, wherein said X-ray source; fluorescent screen means, first and second light reflecting means, and viewing means are disposed in a generally U-shaped arrangement.

6. An X-ray optical system for examining an article, as in claim 1, wherein said viewing means includes a mirror element.

7. An X-ray optical system for examining an article, as in claim 6, wherein said mirror element is pivotably mounted.

8. An X-ray optical system for examing an article, as in claim 1, wherein said X-ray source, fluorescent screen means, and first light reflecting means are dispersed substantially on a first axis, and said second light reflecting means and viewing means are disposed substantially on a second axis, said first and second axes being substantially parallel and substantially vertical.

9. An X-ray optical system for examining an article, as in claim 1, wherein said viewing means further includes an optical arrangement having a distant focus of at least three feet from an operator's eye position.

10. An X-ray optical system for examining an article, as in claim 1, wherein said viewing means further includes an objective lens and an adjustable mirror element which directs the intensified light image of said article into a third direction, said image intensifier, said objective lens and said mirror element being disposed in said second direction.

11. An X-ray optical system for examining an article, as in claim 3, wherein said fluorescent screen means constitutes the bottom of said chamber, and supports said article.

12. An X-ray optical system for examining an article, as in claim 4, wherein said mirrors of said first and second reflecting means comprise front surface mirrors.

13. An X-ray optical system for examining an inanimate article, comprising:
 (a) a source of X-ray directed in a first direction,
 (b) fluorescent screen means for converting said X-rays to a light image, said screen means being disposed downstream of said X-ray source in said first direction,
 (c) means disposed between said X-ray source and said fluorescent screen means for receiving an article such that said X-rays passing through said article reach said screen means to generate thereat a light image of said article,
 (d) a first light reflecting means disposed downstream of said fluorescent screen means in said first direction for receiving said light image from said fluorescent screen means and directing said light image into a second direction,
 (e) second light reflecting means disposed opposite and obliquely to said first light reflecting means for receiving said light image reflected from said first light reflecting means and for redirecting said light image in a third direction being opposite to said first direction, and
 (f) means including an image intensifier disposed downstream of said second light reflecting means in said third direction for viewing said light image.

14. An X-ray optical system for examining an article, as in claim 13, wherein said viewing means further incudes an optical arrangement having a distant focus of at least three feet from an operator's eye position.

15. An X-ray optical system for examining an article, as in claim 12, wherein said viewing means further includes an objective lens and an adjustable mirror element which directs the intensified light image of said article into a fourth direction, said image intensifier, said objective lens and said mirror element being disposed in said third direction.

16. An X-ray optical system for examining an article, as in claim 13, wherein said article receiving means comprises an X-ray impermeable chamber partially defined by a closable opening by which said article is introduced into said chamber.

17. An X-ray optical system for examining an article, as in claim 16, wherein said fluorescent screen means constitutes the bottom of said chamber, and supports said article.

18. An X-ray optical system for examining an article, as in claim 13, wherein said first and second light reflecting mean comprise mirrors.

19. An X-ray optical system for examining an article, as in claim 18, wherein said mirrors of said first and second reflecting means comprise front surface mirrors.

20. An X-ray optical system for examining an article, as in claim 13, wherein said first and third directions are parallel.

* * * * *